US011771534B2

(12) United States Patent
Yen et al.

(10) Patent No.: US 11,771,534 B2
(45) Date of Patent: Oct. 3, 2023

(54) APPARATUS AND METHOD FOR THREE-DIMENSIONAL LAMINATING A CERAMIC DENTURE IN A COLOR-AND-TRANSMITTANCE VARIABLE MANNER

(71) Applicant: FRANZ COLLECTION INC., Taipei (TW)

(72) Inventors: Feng-Ming Yen, Taipei (TW); Chun-Jung Yen, Tainan (TW); Yuh Che Tang, New Taipei (TW); Nai-Hui Liu, Taoyuan (TW)

(73) Assignee: FRANZ COLLECTION INC., Taipei (TW)

( * ) Notice: Subject to any disclaimer, the term of this patent is extended or adjusted under 35 U.S.C. 154(b) by 0 days.

(21) Appl. No.: 17/558,707

(22) Filed: Dec. 22, 2021

(65) Prior Publication Data

US 2023/0190427 A1 Jun. 22, 2023

(51) Int. Cl.
| | |
|---|---|
| *A61C 13/08* | (2006.01) |
| *B28B 13/02* | (2006.01) |
| *B33Y 70/10* | (2020.01) |
| *A61C 13/00* | (2006.01) |
| *B33Y 30/00* | (2015.01) |
| *B28B 1/00* | (2006.01) |
| *B33Y 10/00* | (2015.01) |

(52) U.S. Cl.
CPC .......... *A61C 13/08* (2013.01); *A61C 13/0004* (2013.01); *A61C 13/0019* (2013.01); *B28B 1/001* (2013.01); *B28B 13/0275* (2013.01); *B33Y 10/00* (2014.12); *B33Y 30/00* (2014.12); *B33Y 70/10* (2020.01)

(58) Field of Classification Search
CPC ...... A61C 13/083; A61K 6/818; B28B 1/001; B32B 18/00
See application file for complete search history.

(56) References Cited

U.S. PATENT DOCUMENTS

2022/0273403 A1* 9/2022 Gödiker ............... C04B 35/486
2022/0281162 A1* 9/2022 Liu ..................... A61C 13/0022

FOREIGN PATENT DOCUMENTS

| KR | 20190123360 A | * 11/2019 |
| WO | WO-2022074494 A1 | * 4/2022 |

* cited by examiner

*Primary Examiner* — Timothy Kennedy
*Assistant Examiner* — Ariella Machness
(74) *Attorney, Agent, or Firm* — McClure, Qualey & Rodack, LLP

(57) ABSTRACT

The present invention relates to an apparatus and method for three-dimensionally laminating a ceramic denture in a color-and-transmittance variable manner. A base slurry and a light transmissive slurry are mixed at a ratio regulated by a main controller according to a slurry ratio parameter datum, and then a slurry mixture is laid on a substrate by a laying module to form a slurry layer; next, the slurry layer is photocured by a photocuring module according to a laminated graphic under control of the main controller; in such a manner, the slurry layers are laminated and cured one by one so that a denture green body is formed; finally, the denture green body is sintered at a high temperature to form a ceramic denture. The present invention allows each slurry layer to exhibit different color and transmittance, resulting in quite natural gradation of color and gradation of transmittance.

6 Claims, 6 Drawing Sheets

APPARATUS AND METHOD FOR THREE-DIMENSIONAL LAMINATING A CERAMIC DENTURE IN A COLOR-AND-TRANSMITTANCE VARIABLE MANNER

FIELD OF THE INVENTION

The present invention relates to an apparatus and a method for three-dimensionally laminating and coloring a ceramic denture, and in particular to an apparatus and a method capable of varying color and transmittance during lamination.

DESCRIPTION OF THE RELATED ART

It is always expected that a denture looks like a natural tooth, even whiter and better in transmittance than the natural tooth. In fact, a natural tooth is not of a single color, and the neck, body and incisal edge of the crown are different in terms of color and transmittance. The incisal edge is whitish and has the highest transmittance, while the neck is yellowish and has the lowest transmittance.

U.S. patent application Ser. No. 17/135,673, entitled "APPARATUS AND METHOD FOR THREE-DIMENSIONAL LAMINATING AND COLORING A DENTAL CERAMIC CROWN" is a related prior application, in which a slurry layer is laid, a colorant layer is sprayed on thereon, and then the slurry layer is photocured to form a predetermined shape. The advantage of this technology is that each slurry layer can be colored, the color of each colorant layer can be varied at any time, resulting in gradation of color, and a specific pattern can be customized. The only drawback is that it is difficult to adjust transmittance, because the adjustment of transmittance relied on zirconia powder used as a base slurry. In this technology, the formula of the slurry cannot be changed during the manufacturing process.

SUMMARY OF THE INVENTION

The main object of the present invention is to provide an apparatus for three-dimensionally laminating a ceramic denture in a color-and-transmittance variable manner capable of adjusting transmittance and color so as to exhibit natural gradation of color and gradation of transmittance.

To achieve the above object, the present invention provides an apparatus for three-dimensionally laminating a ceramic denture in a color-and-transmittance variable manner, comprising a base slurry tank, a light transmissive slurry tank, a laying module, a photocuring module and a main controller, wherein the base slurry tank is filled with a base slurry made of 4Y or less partially stabilized zirconia (PSZ) powder, photocurable resin, solvent, additive and colorant; the light transmissive slurry tank is filled with a light transmissive slurry made of 5Y or more partially stabilized zirconia powder, photocurable resin, solvent and additive; the laying module is communicated with the base slurry tank and the light transmissive slurry tank; the main controller is electrically connected to the base slurry tank, the light transmissive slurry tank, the laying module and the photocuring module; and the main controller includes a memory module which stores a plurality of laminated graphics and a plurality of slurry ratio parameter data, the plurality of laminated graphics are obtained by slicing a three-dimensional image of a denture to be formed at a specific thickness along a specific direction, and the plurality of slurry ratio parameter data correspond to the plurality of laminated graphics. The main controller controls the base slurry tank and the light transmissive slurry tank to supply the base slurry and the light transmissive slurry to the laying module according to the plurality of slurry ratio parameter data; the main controller controls the laying module to lay a plurality of slurry layers one by one; and the main controller further controls the photocuring module to photocure the plurality of slurry layers according to the plurality of laminated graphics.

To achieve the above object, the present invention provides a method for three-dimensionally laminating a ceramic denture in a color-and-transmittance manner, comprising the steps of: preparing a base slurry, a light transmissive slurry, a plurality of laminated graphics and a plurality of slurry ratio parameter data, wherein the base slurry is made of 4Y or less partially stabilized zirconia powder, photocurable resin, solvent, additive and colorant, the light transmissive slurry is made of 5Y or more partially stabilized zirconia powder, photocurable resin, solvent and additive, the plurality of laminated graphics are obtained by slicing a three-dimensional image of a denture to be formed at a specific thickness along a specific direction, and the plurality of slurry ratio parameter data correspond to the plurality of laminated graphics; regulating a ratio of the base slurry to the light transmissive slurry by a main controller according to one of the plurality of slurry ratio parameter data, and then controlling a laying module by the main controller to lay the slurries evenly on a substrate to form a slurry layer; next, controlling a photocuring module by the main controller to photocure the slurry layer according to one of the plurality of laminated graphics; repeating the laying step and the photocuring step mentioned above to form a denture green body; and finally, sintering the denture green body at a high temperature to form the ceramic denture.

In other words, the main controller can regulate the ratio of the base slurry to the light transmissive slurry according to the preset slurry ratio parameter data and photocure the slurry layers one by one according to the preset laminating graphics so that the slurry layers present different colors and transmittances. The ceramic denture finally formed has natural color and transmittance and can be highly customized. Customized production can be made according to requirements of a patient. For example, the shape, color and transmittance can be adjusted according to the shape, color and transmittance of the original tooth or the adjacent matching teeth or according to the requirements of the patient. The present invention can also be applied to batch mass production of, for example, ceramic blocks and porcelain laminate veneers which can be further processed and shaped.

DESCRIPTION OF THE PREFERRED EMBODIMENTS

Figure 1:
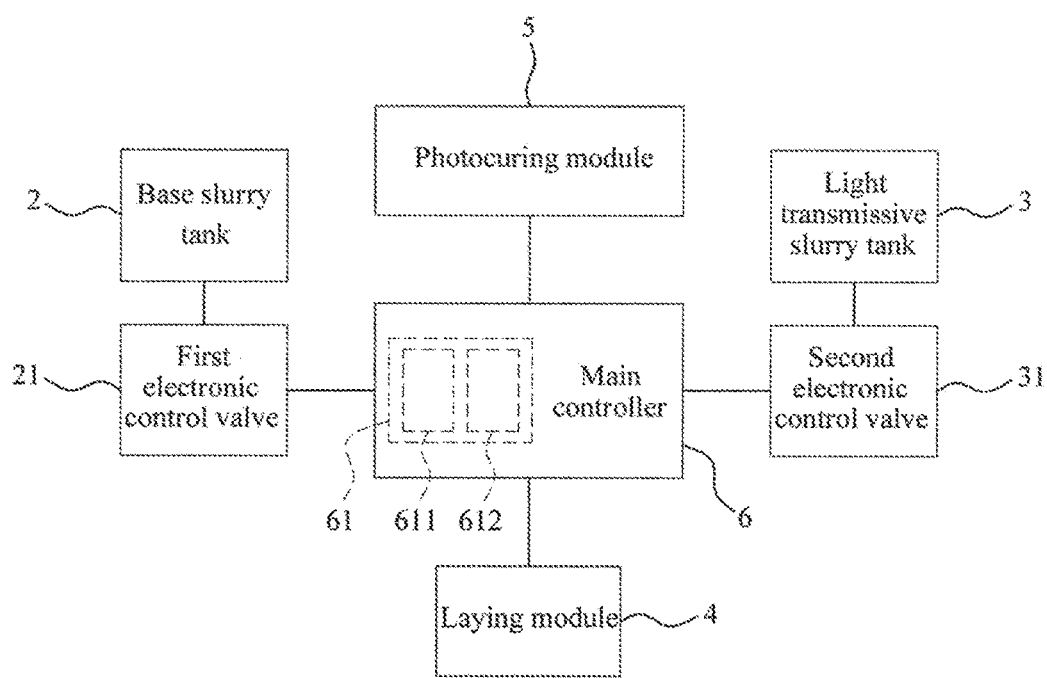
FIG. 1 is a system architecture diagram of a preferred embodiment of an apparatus of the present invention.

Before an apparatus and a method for three-dimensionally laminating a ceramic denture in a color-and-transmittance variable manner according to the present invention is described in detail, it should be noted that in the following description, similar components will be designated by the same reference numerals, the drawings are for illustrative purpose only and are not necessarily drawn to scale, and not all details are necessarily presented in the drawings.

Figure 2A:
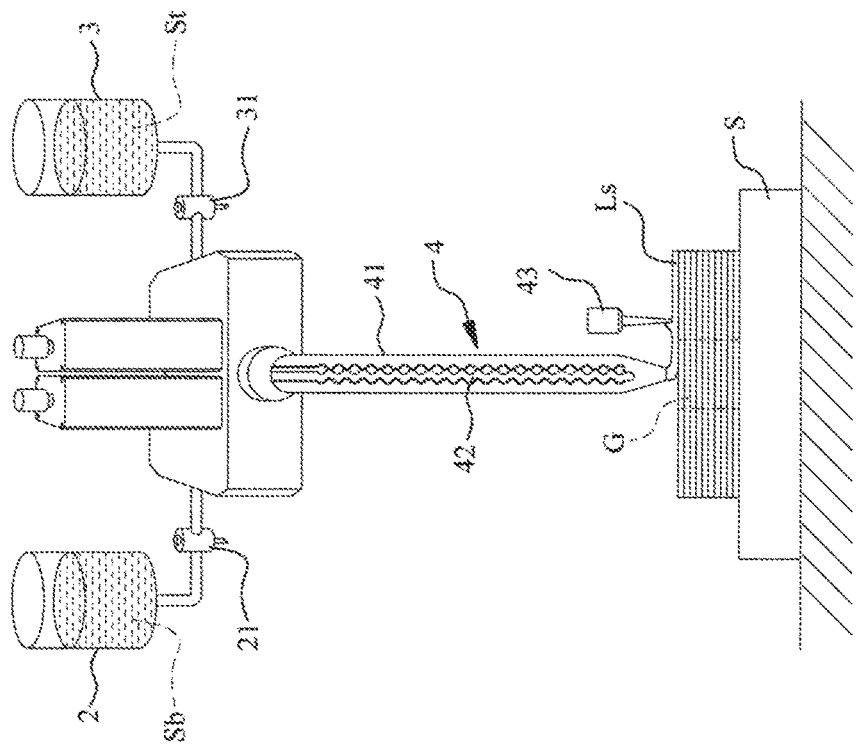
FIG. 2A is a schematic diagram of a first embodiment of the apparatus of the present invention.

Reference is made to FIG. 1 and FIG. 2A. FIG. 1 is a system architecture diagram of a preferred embodiment of an apparatus of the present invention, and FIG. 2A is a schematic diagram of a first embodiment of the apparatus of the present invention. As shown in the figure, this embodiment mainly includes a base slurry tank 2, a light transmissive slurry tank 3, a laying module 4, a photocuring module 5 and a main controller 6. The base slurry tank 2 includes a first electronic control valve 21 and is filled with a base slurry Sb, and the light transmissive slurry tank 3 includes a second electronic control valve 31 and is filled with a light transmissive slurry St. The base slurry Sb of this embodiment is made of 100 parts by weight of 3Y partially stabilized zirconia powder, 7 to 16 parts by weight of photocurable resin, 10 to 20 parts by weight of solvent, 1.5 to 14 parts by weight of additives and 0.1 to 0.2 part by weight of colorant.

The photocurable resin is mainly composed of 30 to 55% by weight of acrylate monomer, 30 to 40% by weight of acrylate oligomer, 1 to 4% by weight of photoinitiator and 0 to 2% by weight of additive. The solvent is deionized water. The additive includes 0.5 to 10 parts by weight of dispersant and 1 to 4 parts by weight of binder. The dispersant includes at least one of polycarboxylate, polymer ammonium salt and polymer sodium salt. The binder includes at least one of polyethylene glycol, polyvinyl alcohol and polyethylene oxide having molecular weight of 1500 to 8000. The colorant is iron oxide.

The composition and the ingredient ratio of the light transmissive slurry St are substantially similar to those of the base slurry Sb, the only difference lies in that the light transmissive slurry St uses 6Y partially stabilized zirconia powder and no colorant is added. The 3Y partially stabilized zirconia powder selected for the base slurry Sb is composed of 97 mol % zirconium dioxide ($ZrO_2$) and 3 mol % yttrium oxide ($Y_2O_3$), and the 6Y partially stabilized zirconia powder selected for the light transmissive slurry St is composed of 94 mol % zirconium dioxide ($ZrO_2$) and 6 mol % yttrium oxide ($Y_2O_3$). Generally, the higher the zirconium dioxide content is, the higher the hardness is. The higher the yttrium oxide content is, the higher the light transmittance is. Therefore, in this embodiment, the above two types of zirconia powder are used to produce the ceramic denture which can exhibit gradation of transmittance without affecting the strength.

Furthermore, the transmittance mentioned in this embodiment refers to D65 transmittance commonly used in the industry. A turbidity meter (manufactured by Nippon Denshoku Co., Ltd., model: NDH2000) is used to measure the total light transmittance with a D65 light source that simulates artificial daylight in accordance with JIS K 7361.

Reference is made to FIG. 2A. The laying module 4 includes a mixing tank 41, an agitator 42 and a scraper module 43. The mixing tank 41 and the agitator 42 constitute a rotary positive displacement screw pump. When a screw serving as the agitator 42 and a rotor at the same time is rotated, a plurality of negative pressure chambers are formed between the rotor and a stator to generate a suction force and feed the slurries to a substrate S. The slurries are supplied through the mixing tank 41 and leveled off by the scraper module 43 so as to lay a slurry layer Ls evenly.

Moreover, the first electronic control valve 21 and the second electronic control valve 31 are electronically controlled proportional valves capable of precisely controlling the amounts of the base slurry Sb and the light transmissive slurry St supplied to the mixing tank 41 from the base slurry tank 2 and the light transmissive slurry tank 3 respectively. The photocuring module 5 of this embodiment is a UV digital light processing (DLP) projector capable of projecting a UV light with different light patterns on the slurry layer Ls according to the laminated graphics to cure the slurry layer.

The main controller 6 can be a general industrial computer or another electronic device having functions of computing, storing data and controlling peripheral devices. The main controller 6 is electrically connected to the first electronic control valve 21, the second electronic control valve 31, the laying module 4 and the photocuring module 5. Moreover, the main controller 6 includes a memory module 61, which stores a plurality of laminated graphics 611 and a plurality of slurry ratio parameter data 612.

The plurality of laminated graphics 611 are obtained by slicing the three-dimensional image of a ceramic crown to be formed at a specific thickness along a specific direction. The three-dimensional image of the ceramic crown to be formed is sliced into the plurality of laminated graphics 611 by means of an image processing unit (not shown in the figure). The three-dimensional image can be obtained by scanning a physical object or a model with an optical 3D scanning system or obtained by means of computer CAD drafting. The thickness of each laminated graphic 611 is set according to the thickness of the slurry layer to be laid by the laying module 4. The plurality of slurry ratio parameter data 612 correspond to the plurality of laminated graphics 611 respectively, that is, each laminated graphic 611 is correlated to a respective ratio of the base slurry Sb to the light transmissive slurry St.

Figure 2B:
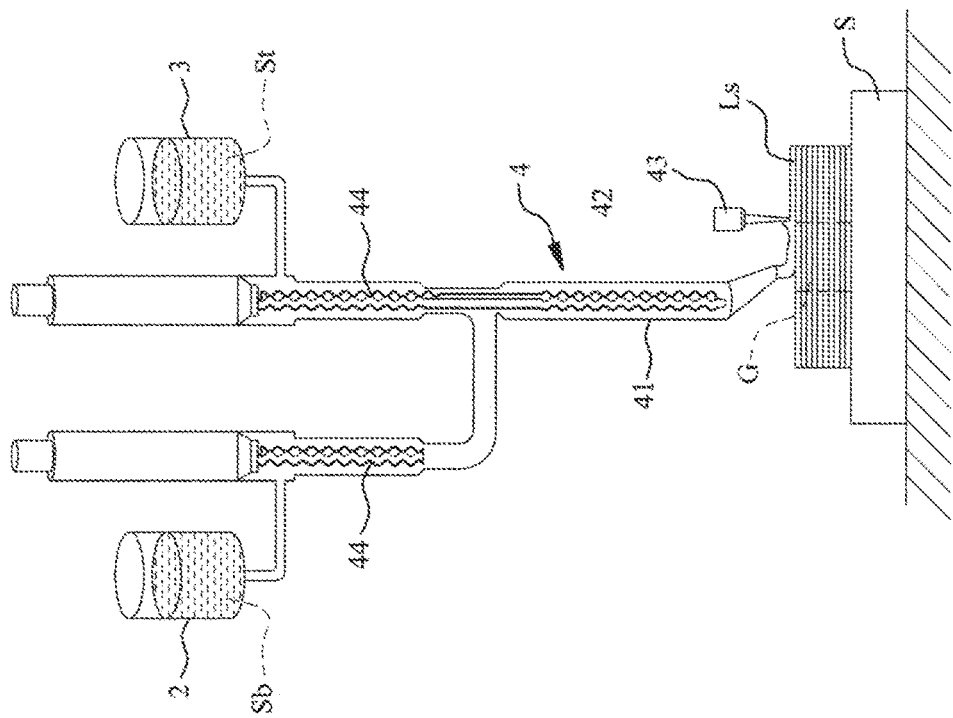
FIG. 2B is a schematic diagram of a second embodiment of the apparatus of the present invention.

Reference is made to FIG. 2B, which is a schematic diagram of a second embodiment of the apparatus of the present invention. The main difference between the second embodiment and the first embodiment lies in that the slurries are non-premixed in the second embodiment. Each of the base slurry tank 2 and the light transmissive slurry tank 3 of the second embodiment is equipped with a screw pump 44 capable of serving as the first electronic control valve 21 or the second electronic control valve 31 of the first embodiment. The amount of the base slurry Sb and the amount of the light transmissive slurry St supplied to the mixing tank 41 can be controlled by adjusting the number of revolutions and the rotation speed of the screw pumps 44 of the base slurry tank 2 and the light transmissive slurry tank 3.

Figure 3:
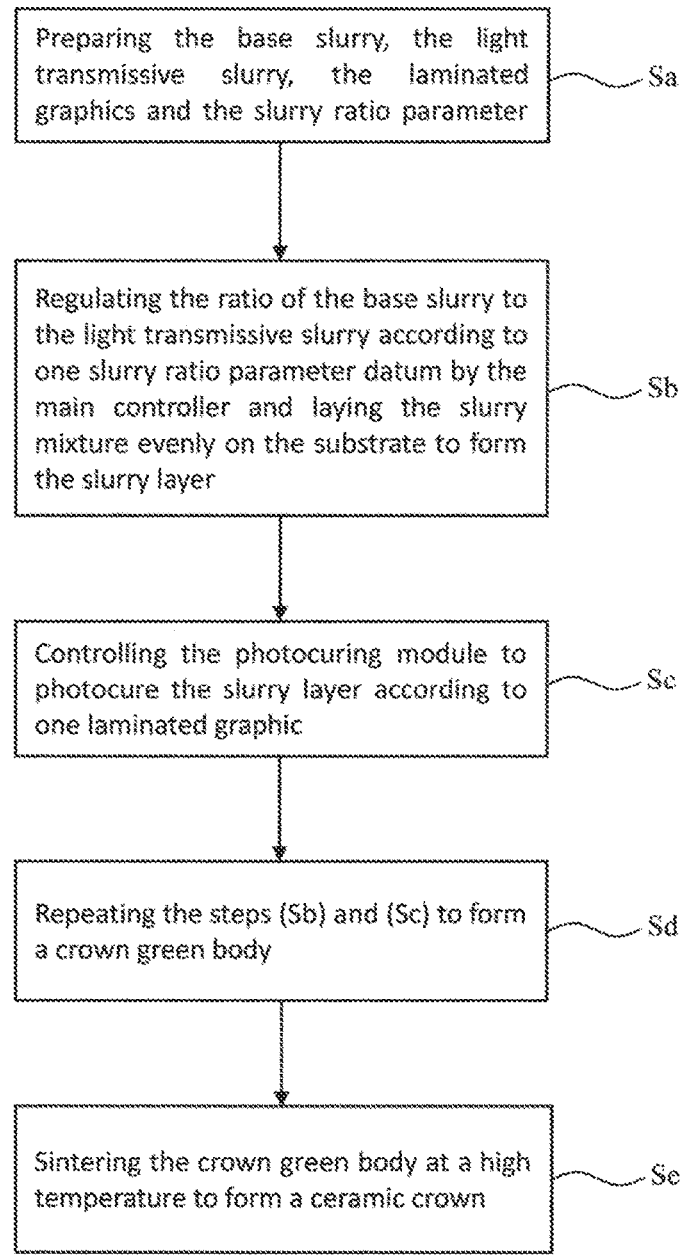
FIG. 3 is a flowchart of a preferred embodiment of a method of the present invention.

Reference is made to FIG. 3, which is a flowchart of a preferred embodiment of the method of the present invention. The manufacturing method provided by this embodiment will be described in the following description. In the step (Sa), the base slurry Sb, the light transmissive slurry St, the plurality of laminated graphics 611 and the plurality of slurry ratio parameter data 612 are prepared. The detailed formulas and related contents are described in the foregoing paragraphs. In step (Sb), the ratio of the base slurry Sb to the light transmissive slurry St is regulated by the main controller 6 according to the slurry ratio parameter data 612. That is, the amount of the base slurry Sb supplied to the mixing tank 41 from the base slurry tank 2 and the amount of the light transmissive slurry St supplied to the mixing tank 41 from the light transmissive slurry tank 3 are controlled by the first electronic control valve 21 and the second electronic control valve 31 in the case of the first embodiment and by the screw pumps 44 in the case of the second embodiment. The main controller 6 also controls the laying module 4 to lay the slurries on the substrate S evenly to form the slurry layer Ls.

In the step (Sc), the main controller 6 controls the photocuring module 5 to photocure the slurry layer Ls according to the laminated graphics 611. Then, in the step (Sd) of FIG. 3, the aforementioned steps (Sb) and (Sc) are performed repeatedly to form a crown green body G. Finally, in the step (Se), the crown green body G is sintered at a high temperature to form a ceramic crown Dc.

Figure 4:
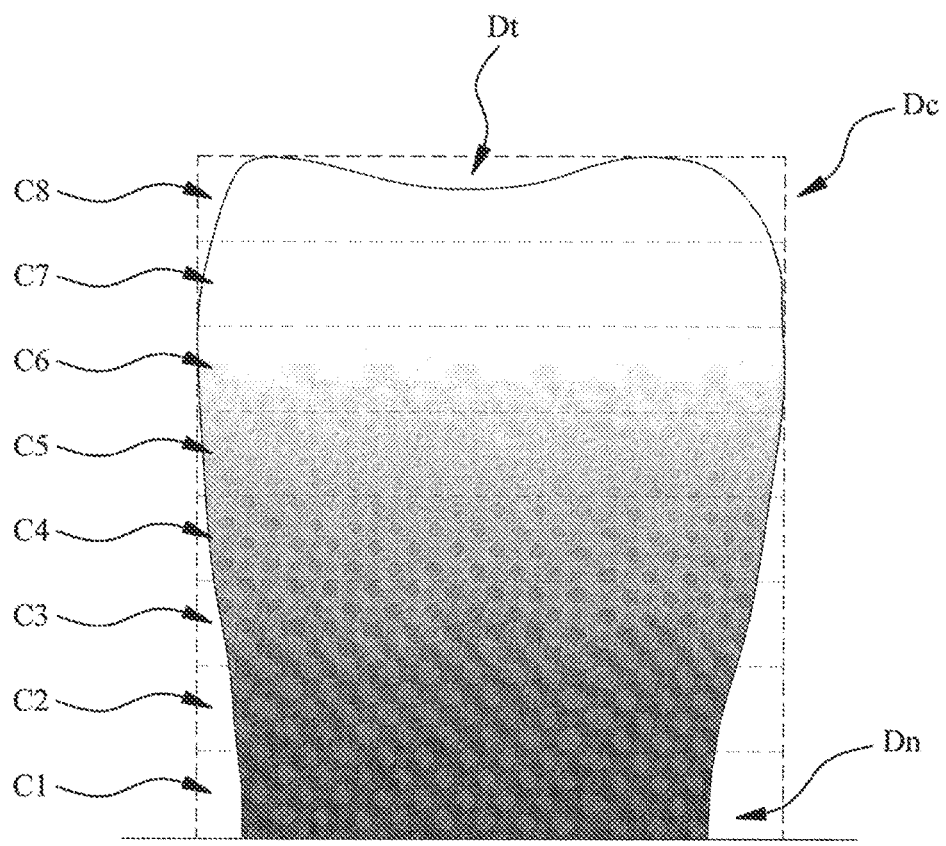
FIG. 4 is a schematic diagram of a ceramic crown green body produced according to the method of the present invention.

Reference is made to FIG. 4 and a table below. FIG. 4 is a schematic diagram of the ceramic crown green body produced according to the method of the present invention. The table below shows the ratio of the base slurry Sb to the light transmissive slurry St and the transmittance and color for each of the slurry ratio parameter data 612. As shown in FIG. 4, in this embodiment, when the main controller 6 performs a laminating and photocuring process from the neck Dn of the ceramic crown Dc to the incisal edge Dt of the ceramic crown Dc according to the laminated graphics 611, the main controller 6 controls the first electronic control valve 21 and the second electronic control valve 31 of the first embodiment or the screw pumps 44 of the second embodiment according to the slurry ratio parameter data 612, so that the ratio by weight of the base slurry Sb to the light transmissive slurry St flowing into the laying module 4 gradually varies from 100:0 to 0:100.

According to this embodiment, the slurry ratio parameter data 612 include 8 parameter data, i.e. the first ratio parameter datum C1 to the eighth ratio parameter datum C8, which present different transmittances and colors. As to the first ratio parameter datum C1, the proportion of the base slurry Sb is 100% by weight, and the proportion of the light transmissive slurry St is 0% by weight. Because it is completely composed of the base slurry St, the color is dark yellow, and the transmittance is 25%.

As to the second ratio parameter datum C2, the proportion of the base slurry Sb is 80% by weight, and the proportion of the light transmissive slurry St is 20% by weight; as to the third ratio parameter datum C3, the proportion of the base slurry Sb is 67% by weight, and the proportion of the light transmissive slurry St is 33% by weight; as to the fourth ratio parameter datum C4, the proportion of the base slurry Sb is 43% by weight, and the proportion of the light transmissive slurry St is 57% by weight; as to the fifth ratio parameter datum C5, the proportion of the base slurry Sb is 40% by weight, and the proportion of the light transmissive slurry St is 60% by weight; as to the sixth ratio parameter datum C6, the proportion of the base slurry Sb is 30% by weight, and the proportion of the light transmissive slurry St is 70% by weight; as to the seventh ratio parameter datum C7, the proportion of the base slurry Sb is 13% by weight, and the proportion of the light transmissive slurry St is 87% by weight; and as to the eighth ratio parameter datum C8, the proportion of the base slurry Sb is 0% by weight, and the proportion of the light transmissive slurry St is 100% by weight.

It can be seen from the above that from the second ratio parameter datum C2 to the eighth ratio parameter datum C8, the proportion of the base slurry Sb is gradually decreased, and the proportion of the light transmissive slurry St is gradually increased. As such, the color of the slurry layer becomes lighter as the proportion of the base slurry Sb is decreased, that is, the color is gradually changed from A4 to A1. The color of the slurry prepared according to the eighth ratio parameter datum C8 is white. The transmittance is gradually increased from 28% to 49% as the proportion of the light transmissive slurry St is increased.

TABLE

| | The proportion of base slurry(%) | The proportion of light transmissive slurry(%) | Transmittance (%) | Color |
|---|---|---|---|---|
| The first ratio parameter datum | 100 | 0 | 25 | yellow |
| The second ratio parameter datum | 80 | 20 | 28 | A4 |
| The third ratio parameter datum | 67 | 33 | 31 | A3.5 |
| The fourth ratio parameter datum | 43 | 57 | 34 | A3 |
| The fifth ratio parameter datum | 40 | 60 | 38 | A2 |
| The sixth ratio parameter datum | 30 | 70 | 41 | A1 |
| The seventh ratio parameter datum | 13 | 87 | 45 | |
| The eighth ratio parameter datum | 0 | 100 | 48 | white |

Since two different slurries are mixed and stirred, a thermal shock effect may occur during a sintering process and a cooling process after sintering. Generally speaking, a temperature difference of 1° C. may cause a difference of volumetric thermal expansion of 0.5 ppm between two types of zirconia powder with different Y numbers. In order to suppress the thermal shock effect, in this embodiment, a heating process and a cooling process in the sintering process of the step (Se) are further set as follows.

The heating process of the step (Se) includes a first heating stage, a second heating stage, a third heating section and a constant temperature sintering stage. During the first heating stage, the temperature is increased from room temperature to 1000° C. at a heating rate of no more than 8° C./min, and it takes about 125 minutes; during the second heating stage, the temperature is increased from 1000° C. to 1200° C. at a heating rate of no more than 5° C./min, and it takes about 40 minutes; during the third heating stage, the temperature is increased from 1200° C. to 1500° C. or more at a heating rate of no more than 3° C./min, it takes about 100 minutes if the upper limit temperature is 1500° C., and it takes about 117 minutes if the upper limit temperature is 1550° C.; during the constant temperature sintering stage, the temperature is maintained at the upper limit temperature for about 120 minutes.

Next, the cooling process of the step (Se) includes a first cooling stage, a second cooling stage and a third cooling stage. During the first cooling stage, the temperature is lowered from 1500° C. or more to 700° C. at a cooling rate of no more than 5° C./min, it takes about 106 minutes if the upper limit temperature is 1500° C., and it takes about 170 minutes if the upper limit temperature is 1550° C.; during the second cooling stage, the temperature is lowered from 700° C. to 280° C. at a cooling rate of no more than 7° C./min, and it takes about 60 minutes; during third cooling stage, the temperature is lowered from 280° C. to room temperature in a natural cooling manner under room temperature, and the time it takes depends on room temperature and ventilation conditions.

Figure 5:
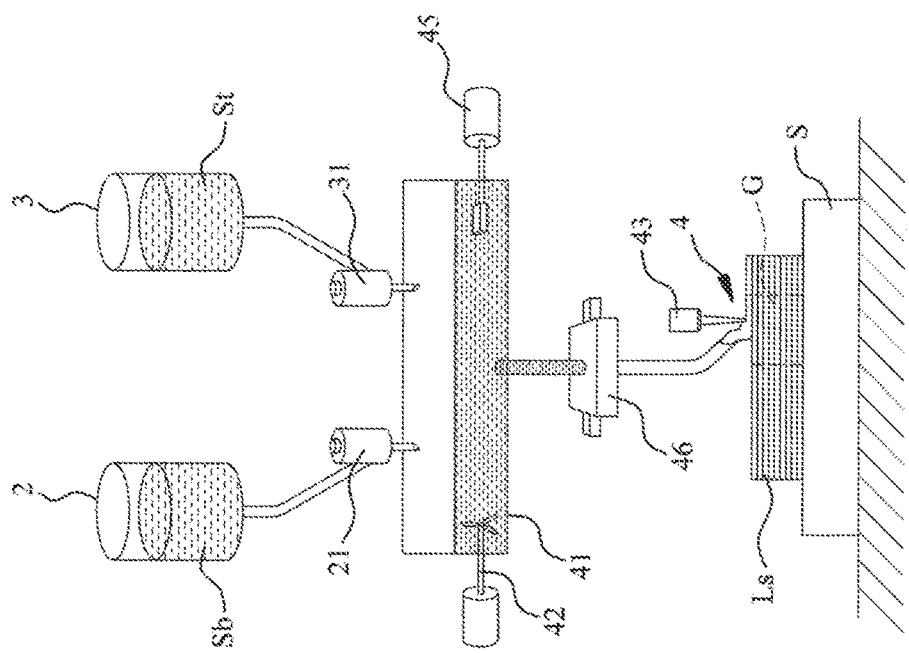
FIG. 5 is a schematic diagram of a third embodiment of the apparatus of the present invention.
Figure 6:
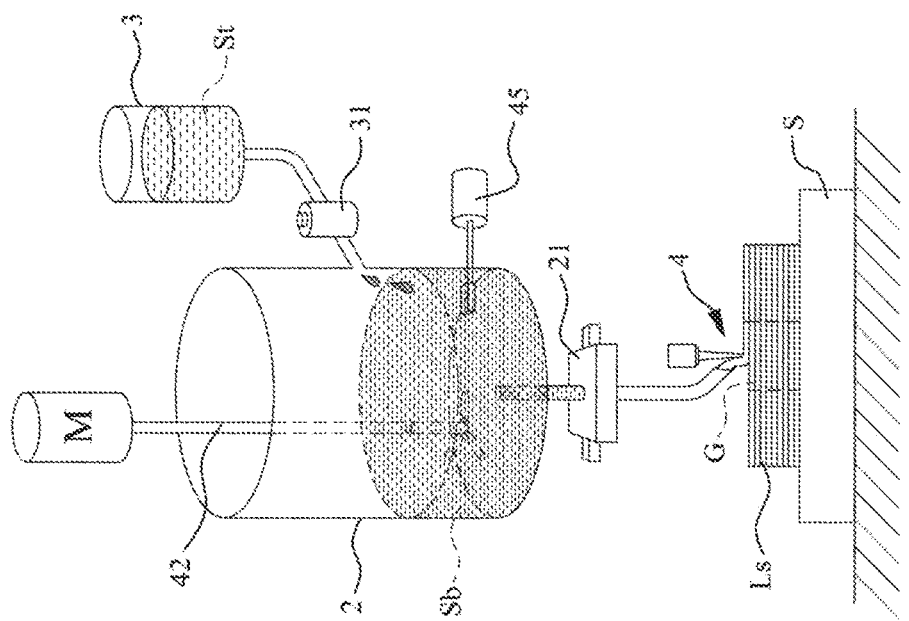
FIG. 6 is a schematic diagram of a fourth embodiment of the apparatus of the present invention.

For the three-dimensional laminating apparatus of the present invention, two embodiments in FIGS. 5 and 6 are further provided. FIG. 5 is a schematic diagram of a third embodiment of the apparatus of the present invention, and FIG. 6 is a schematic diagram of a fourth embodiment of the apparatus of the present invention. As shown in FIG. 5, a first electronic control valve 21 is disposed in a pipeline connecting a base slurry tank 2 to a mixing tank 41 for controlling the amount of a base slurry Sb supplied to the mixing tank 41; and a second electronic control valve 31 is disposed in a pipeline connecting a light transmissive slurry tank 3 to the mixing tank 41 for controlling the amount of a light transmissive slurry St supplied to the mixing tank 41.

Moreover, an agitator 42 and an ultrasonic vibrator 45 are disposed in the mixing tank 41 for enhancing the mixing and stirring effect of the base slurry Sb and the light transmissive slurry St. In addition, the mixing tank 41 is also connected to a vacuum pump (not shown) to remove bubbles in the slurry since the bubbles would form voids. An electronic control valve 46 is disposed in a pipeline connecting the mixing tank 41 to a laying module 4 for controlling supply of the slurry to the laying module 4 or interruption of supply of the slurry and the amount of the slurry supplied.

Regarding the apparatus shown in FIG. 6, a light transmissive slurry tank 3 is connected to a base slurry tank 2, and mixing and stirring are performed in the base slurry tank 2, and a mixing tank is omitted. A second electronic control valve 31 controls the amount of a light transmissive slurry St supplied to the base slurry tank 2, and a first electronic control valve 21 controls the amount of a slurry mixture of a base slurry Sb and the light transmissive slurry St to be supplied to a laying module 4. Similarly, an agitator 42 and an ultrasonic vibrator 45 are provided in the base slurry tank 2, and the base slurry tank 2 is evacuated.

Figure 7:
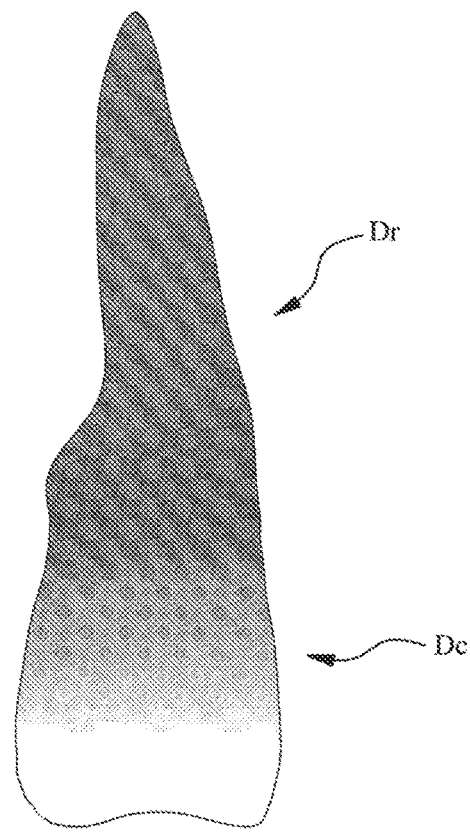
FIG. 7 is a schematic diagram of a ceramic denture green body produced according to the method of the present invention.

Reference is made to FIG. 7, which is a schematic diagram of a ceramic denture green body produced by the method of the present invention. The invention provides an all new type of ceramic denture, which eliminates the need for a metal implant screw and is a one-piece ceramic denture. As shown in FIG. 7, the ceramic denture of this embodiment includes a crown Dc and a root Dr, and the ceramic denture can be produced in one piece using the aforementioned method. The root Dr is directly embedded in the gum so that it is not necessary to take the color and transmittance of the root Dr into consideration. Therefore, the root Dr is completely made of the base slurry Sb, and the crown Dc with gradation of color and gradation of transmittance can be produced by the manufacturing method of the previous embodiment.

In the following is described how to produce and use the integrated ceramic denture in this embodiment. First, a mouth of a patient is scanned by tomography; a model for denture prosthesis is created, in which the root of an original tooth is completely replicated; a ceramic denture is produced by three-dimensional lamination; the ceramic denture is implanted immediately after the original tooth is removed. This method eliminates the lengthy and complicated procedures of traditional dental implantation and eliminates a dental implant surgery of embedding an implant screw so that the risk involved in surgery is extremely low. Moreover, the root of the denture is consistent with the root of the original tooth, can be perfectly combined with the original tooth socket so that it is stable and reliable, and dental beauty and normal use of teeth can be restored in a very short time. Since the color of the root of the denture is close to that of the root of the original tooth, it would not cause changes to the gum color after implantation.

The preferred embodiments of the present invention are illustrative only, and the claimed inventions are not limited to the details disclosed in the drawings and the specification. Accordingly, it is intended that it have the full scope permitted by the language of the following claims.

What is claimed is:

1. An apparatus for three-dimensionally laminating a ceramic denture in a color-and-transmittance variable manner, comprising:
   a base slurry tank, filled with a base slurry, the base slurry includes 100 parts by weight of 3Y-partially stabilized zirconia powder, 7 to 16 parts by weight of photocurable resin, 10 to 20 parts by weight of solvent, 1.5 to 14 parts by weight of additive and 0.1 to 0.2 part by weight of colorant;
   a light transmissive slurry tank, filled with a light transmissive slurry, the light transmissive slurry includes 100 parts by weight of 6Y-partially stabilized zirconia powder, 7 to 16 parts by weight of photocurable resin, 10 to 20 parts by weight of solvent and 1.5 to 14 parts by weight of additive;
   a laying module communicated to the base slurry tank and the light transmissive slurry tank;
   a photocuring module; and
   a main controller, electrically connected to the base slurry tank, the light transmissive slurry tank, the laying module and the photocuring module, the main controller including a memory module which stores a plurality of laminated graphics and a plurality of slurry ratio parameter data, the plurality of laminated graphics being obtained by slicing a three-dimensional image of a denture to be formed at a specific thickness along a specific direction, the plurality of slurry ratio parameter data corresponding to the plurality of laminated graphics,
   wherein the main controller controls the base slurry tank and the light transmissive slurry tank to supply the base slurry and the light transmissive slurry to the laying module according to the plurality of slurry ratio parameter data; the main controller controls the laying module to lay a plurality of slurry layers one by one; the main controller controls the photocuring module to photocure the plurality of slurry layers according to the plurality of laminated graphics.

2. The apparatus of claim 1, wherein the base slurry tank includes a first electronic control valve, and the light transmissive slurry tank includes a second electronic control valve; the main controller controls the first electronic control valve and the second electronic control valve according to the plurality of slurry ratio parameter data to respectively regulate amounts of the base slurry and the light transmissive slurry flowing into the laying module.

3. The apparatus of claim 2, wherein when the main controller performs a laminating and photocuring process from a neck of the ceramic denture to an incisal edge of the ceramic denture according to the plurality of laminated graphics, the main controller controls the first electronic control valve and the second electronic control valve according to the plurality of slurry ratio parameter data so that a ratio by weight of the base slurry and the light transmissive slurry flowing into the laying module is gradually varied from 100:0 to 0:100.

4. The apparatus of claim 3, wherein the plurality of slurry ratio parameter data include a first ratio parameter datum, a second ratio parameter datum, a third ratio parameter datum, a fourth ratio parameter datum, a fifth ratio parameter datum, a sixth ratio parameter datum, a seventh ratio parameter datum, and an eighth ratio parameter datum; wherein the ratio by weight of the base slurry and the light transmissive slurry in the first ratio parameter datum is 100:0; the ratio by weight of the base slurry and the light transmissive slurry in the second ratio parameter datum is 80:20; the ratio by weight of the base slurry and the light transmissive slurry in the third ratio parameter datum is 67:33; the ratio by weight of the base slurry and the light transmissive slurry in the fourth ratio parameter datum is 43:57; the ratio by weight of the base slurry and the light transmissive slurry in the fifth ratio parameter datum is 40:60; the ratio by weight of the base slurry and the light transmissive slurry in the sixth ratio parameter datum is 30:70; the ratio by weight of the base slurry and the light transmissive slurry in the seventh ratio parameter datum is 13:87; the ratio by weight of the base slurry and the light transmissive slurry in the eighth ratio parameter datum is 0:100.

5. The apparatus of claim 1, wherein the solvent is water, the additive includes 0.5 to 10 parts by weight of dispersant and 1 to 4 parts by weight of binder, and the colorant includes iron oxide.

6. The apparatus of claim 2, wherein the laying module includes a mixing tank, an agitator and a scraper module, the mixing tank, the agitator and the scraper module are electrically connected to the main controller; the main controller controls the first electronic control valve and the second electronic control valve according to the plurality of slurry ratio parameter data, thereby respectively regulating the amounts of the base slurry and the light transmissive slurry flowing into the mixing tank, the main controller controls the agitator to stir the slurries in the mixing tank and controls a flow of a slurry mixture of the slurries from the mixing tank, and wherein the main controller controls the scraper module to lay the plurality of slurry layers.

\* \* \* \* \*